May 26, 1970 G. P. DAVIS ETAL 3,514,658
PHOTOELECTRICALLY SENSITIVE DEVICES WITH WINDOW MEANS
ADAPTED TO INCREASE THE ABSORPTION OF RADIATION
BY THE PHOTOELECTRICALLY SENSITIVE CATHODE
Filed Feb. 13, 1967
2 Sheets-Sheet 1
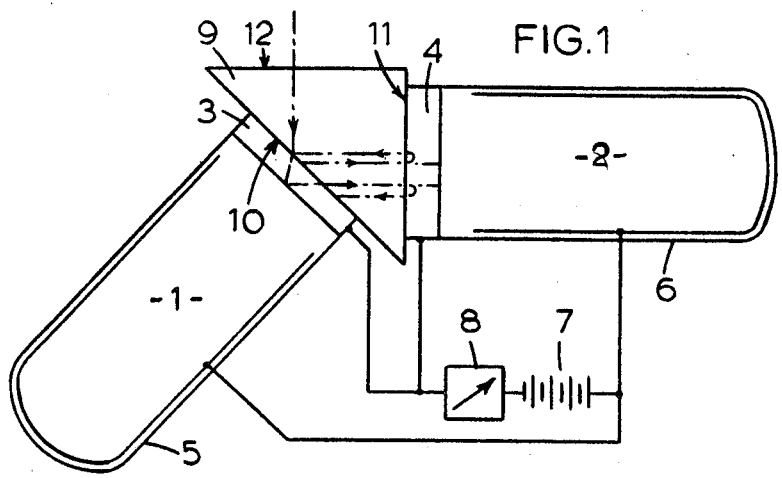
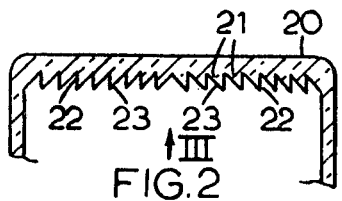
FIG.2
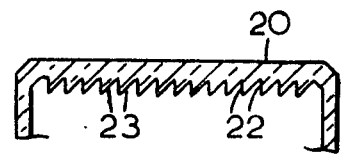
FIG.4
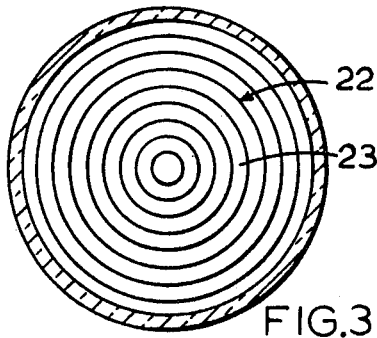
FIG.3
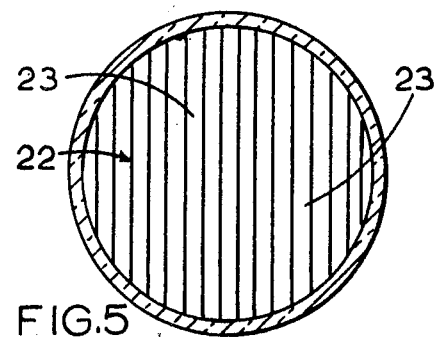
FIG.5
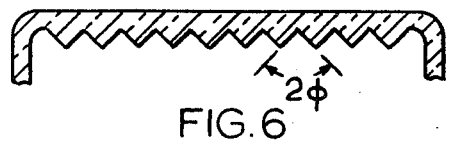
FIG.6

United States Patent Office 3,514,658
Patented May 26, 1970

3,514,658
PHOTOELECTRICALLY SENSITIVE DEVICES WITH WINDOW MEANS ADAPTED TO INCREASE THE ABSORPTION OF RADIATION BY THE PHOTOELECTRICALLY SENSITIVE CATHODE
Gordon Peter Davis, Sunbury-on-Thames, and Susan Margaret Burns, West Drayton, England, assignors to Electric & Musical Industries Limited, Hayes, England, a company of Great Britain
Filed Feb. 13, 1967, Ser. No. 615,633
Claims priority, application Great Britain, Feb. 16, 1966, 6,701/66; May 20, 1966, 22,515/66
Int. Cl. H01j 39/06
U.S. Cl. 313—96    10 Claims

ABSTRACT OF THE DISCLOSURE

A photoelectrically sensitive device, for example a photocell, has a window means having a planar front surface and a rear surface coated with a photoelectrically sensitive material. The rear surface of the window has portions so inclined to the front surface and to each other that radiation received at normal incidence on the front surface passes into the coating on a first portion of the rear surface. Any unabsorbed radiation reaching the free surface of the coating undergoes total internal reflection and passes back through the coating. Any radiation still not absorbed impinges on the coating on another portion of the rear surface of the window means.

---

This invention relates to photoelectrically sensitive devices, especially though not exclusively photoelectron emissive devices such as photocells.

Most photoelectron emissive devices comprises a semi-transparent layer of photoelectron emissive material on a transparent substrate, and a considerable fraction of incident radiation may be lost through reflection at the inter-face of the substrate and the layer, and by transmission through the layer. For example it can be shown that in a device in which the photoemissive layer is composed of multi-alkali material, over half of the incident radiation at 4000 A. may be lost by reflection and transmission and at longer wave lengths the fraction which is lost may rise to three quarters or more.

Wastage of incident radiation may arise for the same reasons in other photoelectrically sensitive devices and the object of the present invention is to provide an improved photoelectrically sensitive device with a view to reducing such wastage.

According to the invention there is provided a photoelectrically sensitive device including window means having a front surface for receiving radiation, and a rear surface having a first part supporting photoelectrically sensitive material and a second part supporting further photoelectrically sensitive material, wherein said first part and second part are inclined to said front surface at predetermined angles so that substantially all the radiation received at normal incidence on said front surface and reaching the free surface of said sensitive material on said first part is totally internally reflected from said free surface onto said further sensitive material.

Figure 7:
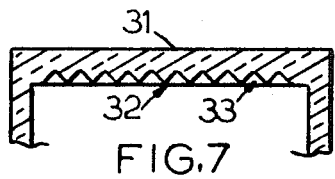
Figure 8:
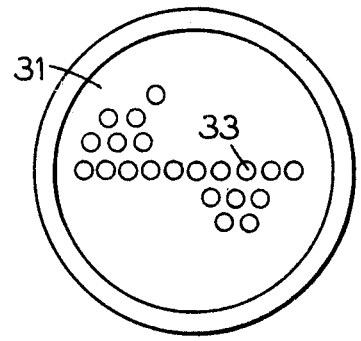
Figure 9:
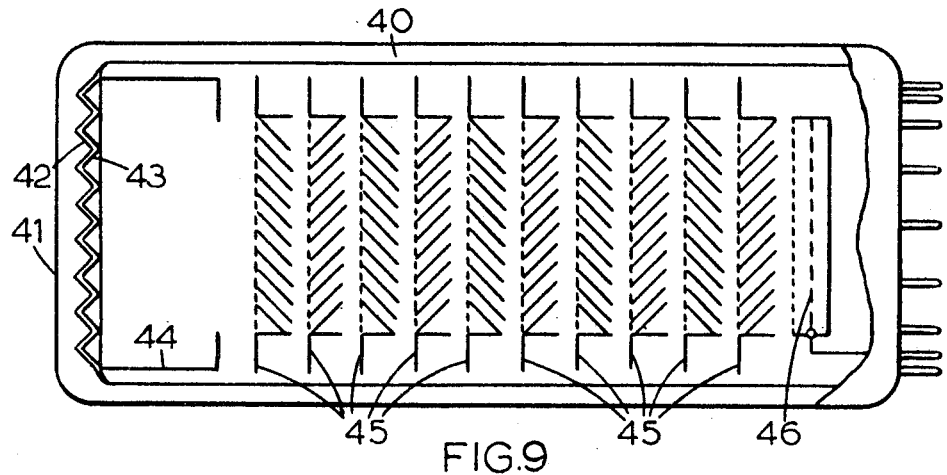
Figure 10:
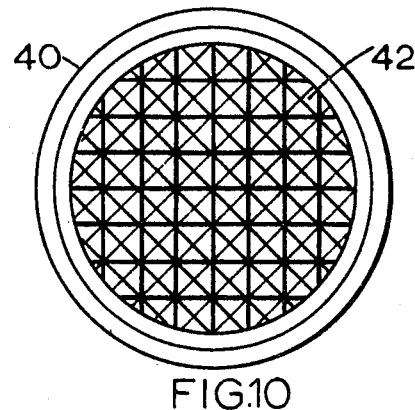

In order that the present invention may be clearly understood and readily carried into effect it will now be described with reference to the accompanying drawings in which:

FIG. 1 illustrates one example of a photoelectron emissive device according to the present invention, FIG. 2 illustrates another form of end window for a photoelectron emissive device according to the invention, FIG. 3 is a view of the end window shown in FIG. 2, looking in the direction of the arrow III, FIGS. 4 and 5 are views similar to FIGS. 2 and 3 of a modification of the end window shown in the latter figures, FIG. 6 shows a modification of FIG. 4, FIGS. 7 and 8 are views similar to FIGS. 2 and 3 of another example of the invention, FIG. 9 is a diagram of a photomultiplier tube according to a further example of the invention, and FIG. 10 is an end view of the tube shown in FIG. 9.

Referring to the drawings, the device illustrated in FIG. 1 comprises two photocells 1 and 2 which are of conventional construction. The cell 1 has a photoelectron emissive cathode layer 3 deposited on a plane transparent window incorporated in the envelope of the cell, and similarly the photocell 2 has a photoelectron emissive cathode layer 4 deposited on a plane transparent window. These emissive layers constitute the photocathodes of the photocells 1 and 2 and anodes are provided in the form of conductive coatings 5 and 6 deposited on the inner surfaces of the envelopes as indicated. The positive terminal of a battery 7 is connected to the anodes 5 and 6 and the negative terminal is connected through a meter 8 to the cathodes 3 and 4. The external surfaces of the windows of the photocells are cemented by Canada balsam to two inclined faces 10 and 11 of a 45° glass prism 9. The Canada balsam has substantially the same refractive index as the prism and end windows of the photocells. The device is set up so that incident light for energising the photocells is incident on the third face 12, that is the front surface, of the prism, the surfaces 10 and 11 forming the rear surface of the prism. It will be understood that the thickness of the photocathodes 3 and 4 is considerably exaggerated in the drawing.

Radiation incident normal to the front face 12 of the prism 9 impinges on the emissive layer 3 at an angle of 45° to the normal of that layer. Part of the radiation is reflected at the layer/cell window inter-face and is directed normally to the layer 4. The remainder of the incident radiation traverses the layer 3 giving rise to photo-emission but in this case the emission is enhanced as the optical path through the layer is greater than the layer thickness. Unabsorbed energy reaching the layer/vacuum interface within the cell 1 suffers total internal reflection and is re-directed through the layer 3 giving further photo-emission. Such photo-emission is also enhanced not only because the optical path is longer than the layer thickness but also because no radiation is lost by transmission through the layer 3 into the vacuum. The radiation unabsorbed in the layer 3 re-enters the glass prism as indicated in FIG. 1, augments the radiation initially reflected at the respective layer/cell window inter-face, and strikes the layer 4 normally. Therefore all radiation reflected from the layer 3 is directed normally to the layer 4, which thus behaves as the photocathode of a conventional photocell receiving incident radiation normally, except that radiation reflected from the layer 4 returns to the inter-face between the layer 3 and its window, and impinges on it at an angle of 45°. Some of this latter radiation produces further emission from the layer 3 by the process already described.

When two photocells each with luminous sensitivity to normally incident radiation of 180 µA./lumen were used in an arrangement such as shown in FIG. 1, a total sensitivity of 400 µA./lumen was obtained. Although the simple configuration of FIG. 1 has practical uses, in many cases it is desirable that the sources of radiation be as close as possible to the emissive layer, for example, for scintillation crystal work. FIG. 2 shows a preferred embodiment of the invention in which it is possible to achieve this, the end window 20 of an otherwise conventional photocell being so formed that its internal, that is rear surface comprises a plurality of 45° prismatic elements 21. As indicated in FIG. 3, the prismatic elements 21 are concentric. A thin layer of photoelectron emissive material is deposited on both faces 22 and 23 of each prismatic element 21. Each prismatic element 21 and the photoemissive material deposited on the faces 22 and 23 constitutes an elementary arrangement such as described with reference to FIG. 1 and will behave in the same way, with however the additional advantage that any energy transmitted through the photoemissive material on the faces 22 will fall on to the material on the adjacent faces 23, giving a further increase in photoemission.

The prismatic elements need not be concentric as indicated in FIG. 2 but may be replaced by a system of parallel prismatic elements such as indicated in FIGS. 4 and 5 or by any other convenient arrangement of prismatic elements.

Although the configuration described above will give maximum enhancement of sensitivity, some difficulty may be experienced in coating the faces 22 and 23 uniformly. An alternative arrangement which removes this difficulty and still provides a considerable enhancement of sensitivity is shown in FIG. 6. In FIG. 6, the angle $\phi$ is such that $(90° - \phi)$ is greater than the critical angle for a glass to vacuum interface. This condition ensures that total internal reflection occurs at the photosensitive layer to vacuum interface.

In the application of the invention to photocells, spread of radiation due to the action of the prismatic elements is immaterial, but in applying the invention to image translating devices, such as television pick-up tubes and image intensifiers the spread of radiation must be restricted to avoid image degradation. Such restriction can be achieved by ensuring that the size of each individual prismatic element is small. For example if the prism depth is less than say 0.01", devices according to the invention may usefully be employed as television pick-up tubes and image intensifiers. It is also to be understood that the angle of 45° for the prismatic elements is not essential. This angle was chosen for the examples described so as to give total internal reflection at the layer/vacuum interface, without necessitating too deep a cut into the glass substrate in examples such as FIGS. 2 and 4.

However, it has been found that comparable results can be achieved if the elements on which the photoelectrically sensitive material is deposited are not, strictly speaking, prismatic, and in another example of the present invention the transparent support for the photosensitive material is formed having on its rear surface a multiplicity of protruberances or indentations, on which surface the photoelectrically sensitvie material is deposited, the protuberances or indentations being systematically formed to reduce wastage of incident radiation by reflection at the inter-face of the support and the sensitive material and by transmission through the sensitive material.

The window of the photocell may be formed otherwise than as illustrated with a multiplicity of protuberances and indentations, for example, it may be as shown in FIGS. 9 and 10 where the rear surface of the window has a square array of pyramidal indentations.

In FIGS. 9 and 10 there is shown an example of a photomultiplier tube having a tubular envelope 40 with a circular window 41 at one end. The rear end surface 42 of the window 41 is formed with a square array of pyramidal indentations by means of a suitable pressing tool applied to the surface of the window 41 whilst the glass is in a softened state. The surface 42 is coated with a layer 43 of a suitable photoelectron emissive material to which is attached a shield electrode 44. The electrons emitted by the layer 43 when the tube is in operation are applied to the ten stage electron multiplier formed by the dynodes 45, shown in FIG. 9 as being of the "Venetian blind" type. The final electron stream is caught by the collector 46.

As shown in FIG. 9 the facets of the pyramidal indentations are at approximately 45° to the plane of the front surface of window 41, so that light reflected at the photoemissive material-vacuum interface of one facet impinges on an adjacent facet with a similar angle of incidence. With a window 41 of soda glass having a refractive index of about 1.5, it will be appreciated that to secure total internal reflection at the facets, the light must be incident on the window 41 within 5° of the normal thereto although for light incident at angles outside this range, it has been found in practice that the sensitivity of the tube does not fall below that of a conventional photomultiplier with a plane rear surface on the window.

The window illustrated by FIGS. 7 and 8 forms part of a photoelectron emissive cell which is generally of conventional construction. The cell has an end window 31 on the inner surface 32 of which is deposited a thin film of photoelectron emissive material. The surface 32 on which the material is deposited is formed with a multiplicity of indentations 33 which are systematically formed by an appropriately formed pressing tool while the end window is heated to softening temperature. The indentations are roughly conical in shape but are slightly rounded at the apieces and edges. Only a few of the indentations 33 are illustrated in FIG. 8.

The angle of the protuberances on the tool used to form the indentations is chosen to produce total internal reflection of light incident on the window 31 at the interface between the photoelectron emissive material and the vacuum of the tube, so that a high proportion of incident radiation is absorbed in the sensitive layer. For example the protuberances may be such that the surfaces of the indentations 33 are inclined at about 45° to the front surface of the window 31. The indentations shown in the drawings are on an enlarged scale relatively to the window. It will be understood that the invention is not restricted to photoelectron emissive cells but may be applied to other photoelectrically sensitive devices.

According to another embodiment of the invention the end window of a photoelectron emissive cell is formed from a single crystal of a suitable transparent material such as quartz. To form the window, the crystal is cut and polished in such a manner that when the surface on which the sensitive material is to be deposited is exposed to suitable etching fluid, a large number of facets all inclined to the plane of the front surface of the window are formed. The sensitive material is thereafter deposited in known manner on the etched surface.

What we claim is:

1. A photoelectrically sensitive device including window means having a front surface for receiving radiation, and a rear surface having a first part supporting photoelectrically sensitive material and a second part supporting further photoelectrically sensitive material, wherein said first part and second part are inclined to said front surface at predetermined angles so that substantially all the radiation received at normal incidence on said front surface and reaching the free surface of said sensitive material on said first part is totally internally reflected from said free surface onto said further sensitive material.

2. A device according to claim 1 wherein said first part of said rear surface is inclined at approximately 45° to said front surface, and said second part of said rear surface is substantially perpendicular to said front surface, whereby radiation reflected from the free surface of said sensitive material on said first part impinges on said further sensitive material.

3. A device according to claim 2 wherein said rear surface includes a plurality of said first parts each inclined at approximately 45° to said front surface and a plurality of said second parts each substantially perpendicular to said front surface.

4. A device according to claim 1 wherein said rear surface includes a plurality of said first parts and a plurality of said second parts, each of said first and second parts being inclined at the same angle relative to said front surface, which angle is at least $\sin^{-1}(1/\mu)$ where $\mu$ is the refractive index of the material of said window means relative to vacuum.

5. A device according to claim 1 wherein said rear surface includes a plurality of said first and said second parts each of annular form and arranged concentrically.

6. A device according to claim 1 wherein said rear surface includes a plurality of said first and said second parts arranged in the form of parallel strips.

7. A device according to claim 4 wherein said plurality of first and second parts are arranged as a closely packed array of substantially conical indentations in said rear surface, the half angle of each cone being approximately 45°.

8. A device according to claim 4 wherein said plurality of first and second parts are arranged as a square array of square pyramidal indentations in said rear surface.

9. A device according to claim 1 wherein said window means forms part of the envelope of the device, and a collector is disposed within the device for collecting electrons emitted from said photoelectrically sensitive material.

10. A device according to claim 9 including at least one electron multiplying electrode.

References Cited
UNITED STATES PATENTS

| | | | |
|---|---|---|---|
| 3,243,626 | 3/1966 | Helvy et al. | 313—95 |
| 3,299,306 | 1/1967 | Kapary | 313—95 |
| 3,415,990 | 12/1968 | Watson | 313—103 X |

RALPH G. NILSON, Primary Examiner

C. M. LEEDOM, Assistant Examiner

U.S. Cl. X.R.

250—211; 313—103